(12) United States Patent
Congdon, II et al.

(10) Patent No.: US 8,676,010 B2
(45) Date of Patent: Mar. 18, 2014

(54) ELECTRICAL CABLE WITH OPTICAL FIBER

(75) Inventors: Herbert Virgil Congdon, II, Conover, NC (US); Richard Walter Speer, Kernersville, NC (US); Keith Wayne Hoover, High Point, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 194 days.

(21) Appl. No.: 13/177,318

(22) Filed: Jul. 6, 2011

(65) Prior Publication Data

US 2013/0011106 A1  Jan. 10, 2013

(51) Int. Cl.
  *G02B 6/44*  (2006.01)
(52) U.S. Cl.
  USPC ......................................... 385/101
(58) Field of Classification Search
  USPC ......................................... 385/101
  See application file for complete search history.

(56) References Cited

U.S. PATENT DOCUMENTS

| 5,026,141 | A | 6/1991 | Griffiths |
| 5,268,971 | A | 12/1993 | Nilsson et al. |
| 5,283,429 | A | 2/1994 | Campolo |
| 5,557,698 | A | 9/1996 | Gareis et al. |
| 5,913,003 | A * | 6/1999 | Arroyo et al. ............... 385/101 |
| 6,687,437 | B1 | 2/2004 | Starnes et al. |
| 2004/0071382 | A1 | 4/2004 | Rich et al. |
| 2004/0114888 | A1 | 6/2004 | Rich et al. |
| 2009/0304322 | A1 * | 12/2009 | Davies et al. ............... 385/12 |

FOREIGN PATENT DOCUMENTS

| DE | 8515470 U1 | 2/1986 |
| WO | WO2005114285 A1 | 12/2005 |

* cited by examiner

*Primary Examiner* — Ryan Lepisto
*Assistant Examiner* — Jerry Blevins
(74) *Attorney, Agent, or Firm* — Merchant & Gould P.C.

(57) ABSTRACT

An electrical cable includes a cable jacket extending a length and having an internal passageway that extends along the length of the cable jacket. Twisted pairs of insulated electrical conductors extend within the internal passageway along the length of the cable jacket. Each twisted pair includes two insulated conductors twisted together in a helical manner. At least two optical fibers extend within the internal passageway along the length of the cable jacket. The optical fibers are independently held within the internal passageway of the cable jacket relative to each other.

16 Claims, 2 Drawing Sheets

ELECTRICAL CABLE WITH OPTICAL FIBER

BACKGROUND OF THE INVENTION

The subject matter described and/or illustrated herein relates generally to electrical cables.

Some known data communication cables include pairs of insulated electrical conductors that are twisted together to form a balanced transmission line. Such pairs of insulated conductors are commonly referred to as "twisted pairs." One example of a data communication cable includes multiple twisted pairs that are bundled and twisted, or cabled, together and covered with a jacket.

It may sometimes be desirable to provide a secure electrical cable to prevent an unauthorized breech of the data being transmitted along the electrical cable. For example, electrical cables used for many military and government communications are monitored and/or secured to prevent the cables from being tapped into by an unauthorized person or entity. But, known monitoring and/or securing methods for electrical cables having twisted pairs are not without disadvantages. One known method for securing electrical cables having twisted pairs includes enclosing the electrical cable in a secure conduit that cannot be tapped into without considerable difficulty. However, enclosing electrical cables in such a secure conduit may be expensive, time-consuming, and/or difficult, for example due to a required robustness of the secure conduit. A known method for monitoring the security of an electrical cable having twisted pairs includes visually inspecting the cable along the length thereof to determine if the cable has been tapped into. But, visually inspecting the length of an electrical cable may take a considerable amount of time, which may result in a delayed determination that the cable has been breached. Moreover, the time-consuming nature of such visual inspection may be prone to operator error and/or may unnecessarily tie up worker capacity.

Accordingly, there is a need for an improved monitoring and/or securing electrical cables having twisted pairs.

BRIEF DESCRIPTION OF THE INVENTION

In one embodiment, an electrical cable includes a cable jacket extending a length and having an internal passageway that extends along the length of the cable jacket. Twisted pairs of insulated electrical conductors extend within the internal passageway along the length of the cable jacket. Each twisted pair includes two insulated electrical conductors twisted together in a helical manner. At least two optical fibers extend within the internal passageway along the length of the cable jacket. The optical fibers are independently held within the internal passageway of the cable jacket relative to each other.

In another embodiment, an electrical cable includes a cable jacket extending a length and having an internal passageway that extends along the length of the cable jacket. Twisted pairs of insulated electrical conductors extend within the internal passageway along the length of the cable jacket. Each twisted pair includes two insulated electrical conductors twisted together in a helical manner. At least one optical fiber extends within the internal passageway along the length of the cable jacket. The at least one optical fiber is configured to sense a disturbance to the electrical cable.

In another embodiment, an electrical cable includes a cable jacket extending a length and having an internal passageway that extends along the length of the cable jacket. Electrical conductors extend within the internal passageway along the length of the cable jacket. The electrical conductors are configured to conduct data signals. At least two optical fibers extend within the internal passageway along the length of the cable jacket. The optical fibers are independently held within the internal passageway of the cable jacket relative to each other.

DETAILED DESCRIPTION OF THE INVENTION

Figure 1:
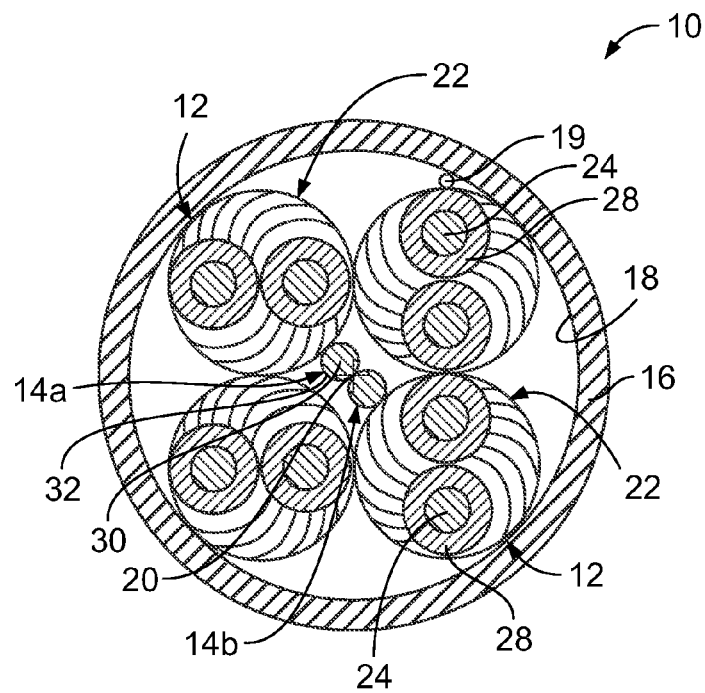
FIG. 1 is a cross section of an exemplary embodiment of an electrical cable.

FIG. 1 is a cross section of the an exemplary embodiment of an electrical cable 10. The cable 10 includes a central core 12, one or more optical fibers 14a and 14b, and a jacket 16. Optionally, the cable 10 includes a rip cord 19 for exposing various internal components of the cable 10, for example to enable termination of such components. The cable 10 extends a length along a central longitudinal axis 20. The jacket 16 extends around the central core 12 and the optical fibers 14a and 14b. More specifically, the jacket 16 extends a length along the length of the cable 10 and includes an internal passageway 18 that extends along the length of the jacket 16. The central core 12 and the optical fibers 14a and 14b extend within the internal passageway 18 of the jacket 16 along the length of the jacket 16. As will be described below, at least one of the optical fibers 14a and/or 14b is configured to sense a disturbance to the electrical cable 10. The jacket 16 may be referred to herein as a "cable jacket".

The central core 12 includes a group of a plurality of twisted pairs 22 of insulated electrical conductors 24. Alternatively, the cable 10 includes a plurality of electrical conductors 24 that are not twisted into twisted pairs. Each electrical conductor 24 is surrounded by an insulative layer 28. Optionally, each of the twisted pairs 22 includes an electrical shield (not shown) that extends therearound. The electrical shield of each twisted pair 22 may be fabricated from any electrically conductive materials, structures, and/or the like, such as, but not limited to, an electrically conductive foil (e.g., a metal foil and/or the like), an electrically conductive tape (e.g., a metal tape and/or the like), and/or the like. In some embodiments, the conductors 24 of the twisted pairs are configured to conduct data signals. The twisted pairs 22 extend within the internal passageway 18 of the jacket 16 along the length of the jacket 16. Optionally, the central core 12 includes a binder element (not shown) that extends around the group of twisted pairs 22 to hold the twisted pairs 22 together around the central longitudinal axis 20. The binder element is wrapped around the twisted pairs 22 to thereby hold the twisted pairs 22 together in the group, with the binder element forming the radially-outermost (relative to the central longitudinal axis 20) component of the central core 12. The binder element may be fabricated from any materials, structures, and/or the like, such as, but not limited to, a dielectric tape, an electrically conductive material (e.g, an electrically conductive foil, an electrically conductive tape, and/or the like such as, but not limited to, a metal foil, a metal tape, and/or the like), and/or the like. When fabricated from an electrically conductive material, the binder element may provide electrical shielding to the central core 12. The materials, structures, and/or the like of the binder element may be selected to comply with any applicable fire safety standards.

The two insulated conductors 24 of each twisted pair 22 are twisted together in a helical manner. In the exemplary embodiment of FIG. 1, the two insulated conductors 24 of each twisted pair 22 are twisted around each other in a clockwise direction. The clockwise wrapping direction is commonly referred to as a "right hand lay direction". Alternatively, the two insulated conductors 24 of one or more of the twisted pairs 22 are twisted around each other in a counter-clockwise direction. The counter-clockwise wrapping direction is commonly referred to as a "left hand lay direction".

Optionally, the twisted pairs 22 of the central core 12 extend along helical paths around the central longitudinal axis 20. In other words, each of the twisted pairs 22 is optionally wound into winding turns that extend around the central longitudinal axis 20. Each twisted pair 22 may be wrapped around the central longitudinal axis 20 in the clockwise or the counter-clockwise direction. The winding turns of the twisted pairs 22 may be interleaved between each other. In other embodiments, the twisted pairs 22 extend along a path that is parallel to the central longitudinal axis 20 instead of a helical path. Although four twisted pairs 22 are shown, the central core 12 may include any number of the twisted pairs 22.

In the exemplary embodiment of FIG. 1, the cable 10 includes two optical fibers 14a and 14b. However, the cable 10 may include any number of optical fibers. In some embodiments, the cable 10 only includes a single optical fiber (e.g., the optical fiber 14a or the optical fiber 14b). The optical fibers 14a and 14b extend within the internal passageway 18 of the jacket 16 along the length of the jacket 16. Each optical fiber 14a and 14b consists of an optically transmissive strand 30, which is optionally coated with one or more insulation layers 32. The strand 30 may be fabricated from any optically transmissive material, such as, but not limited to, a glass, a polymer, a plastic, and/or the like. In the exemplary embodiment of FIG. 1, each optical fiber 14a and 14b consists of the strand 30 and a single insulation layer 32 coated on the strand 30. Optionally, another insulation layer (not shown), which may be different from the insulation layer 32, is coated on the insulation layer 32. The insulation layers 32 may be fabricated from any insulative materials, such as, but not limited to, a plastic, a polymer, polyvinyl chloride (PVC), fluorinated ethylene propylene (FEP), polyvinylidene fluoride (PVDF), polyethylene (PE) PE, and/or the like. Each optical fiber 14a and 14b may have any diameter, such as, but not limited to, a diameter of between approximately 200 um and approximately 1000 um. Each optical fiber 14a and 14b includes an outer surface (which is defined by an outermost insulation layer 32 if included) that may engage one or more of the twisted pairs 22. Each optical fiber 14a and 14b may be considered "sleeveless".

The optical fibers 14a and 14b are independently held within the internal passageway 18 of the jacket 16 relative to each other. By "independently held", it is meant that the optical fibers 14a and 14b are not held within a common insulative sub-jacket (not shown) of the cable 10. In other words, optical fibers that are independently held are not bundled together within a common jacket that extends within the internal passageway 18 of the jacket 16.

As briefly described above, at least one of the optical fibers 14a and/or 14b is configured to sense a disturbance to the electrical cable 10. More specifically, at least one of the optical fibers 14a and/or 14b is configured to change the optical transmission characteristics thereof in response to a mechanical disturbance to the electrical cable 10. For example, at least one of the optical fibers 14a and/or 14b may be configured to sense a disturbance to the electrical cable 10 by communicating an optical signal change along the optical fiber 14a and/or 14b, for example based on flexing of the optical fiber 14a and/or 14b when an attempt is made to cut into, grasp, pull on, lift, and/or the like the electrical cable. In the exemplary embodiment of FIG. 1, each of the two optical fibers 14a and 14b is configured to sense a disturbance to the electrical cable 10. Alternatively, at least one of the optical fibers 14a and/or 14b of the electrical cable 10 is used to transmit data signals, so long as at least one of the optical fibers 14a and/or 14b of the cable 10 is configured to sense a disturbance to the cable 10.

Each of the optical fibers 14a and 14b may be positioned anywhere within the internal passageway 18 of the jacket 16. In the exemplary embodiment of FIG. 1, each optical fiber 14a and 14b extends between the twisted pairs 22 of the central core 12. In other words, the optical fibers 14a and 14b of FIG. 1 are positioned radially (relative to the central longitudinal axis 20) between the axis 20 and the twisted pairs 22 such that the twisted pairs 22 extend around the optical fibers 14a and 14b. The optical fibers 14a and 14b therefore extend through the central core 12 in the exemplary embodiment of FIG. 1. The optical fibers 14a and 14b may be arranged between the twisted pairs 22 in any other pattern than is shown in FIG. 1. Optionally, the optical fibers 14a and 14b are engaged with each other. The optical fibers 14a and 14b may provide a central filler element between the twisted pairs, which may facilitate providing the cable 10 and/or the central core 12 with a predetermined shape (e.g., a circular cross-sectional shape). The diameter, number of, and arrangement of the optical fibers 14a and 14b may be selected to facilitate providing the cable 10 and/or the central core 12 with the predetermined shape.

The optical fibers 14a and 14b are optionally twisted around each other in a helical manner, whether in the clockwise or counter-clockwise direction. When twisted together, the twisted optical fibers 14a and 14b may extend along a helical path (whether clockwise or counter-clockwise) around the central longitudinal axis or may extend along a path that is parallel to the central longitudinal axis 20 instead of a helical path. When the optical fibers 14a and 14b are not twisted together, each optical fiber 14a and 14b may extend along a helical path around the central longitudinal axis 20 or may extend along a path that is parallel to the central longitudinal axis 20 instead of a helical path.

Optionally, the optical fibers 14a and 14b are optically connected to each other. For example, ends (not shown) of the optical fibers 14a and 14b may be optically connected to each other at an end (not shown) of the electrical cable 10. In the exemplary embodiment of FIG. 1, the optical fibers include two discrete optical fibers 14a and 14b. In an alternative embodiment, the optical fibers 14a and 14b represent segments of the length of the same optical fiber that are connected together at a loop (not shown) of the optical fiber. In such an alternative embodiment wherein the electrical cable 10 includes an optical fiber having segments 14a and 14b that are connected together at a loop, the segments 14a and 14b are independently held within the internal passageway 18 of the jacket 16.

The conductors 24 of the twisted pairs 22 may be fabricated from any conductive materials, such as, but not limited to, bare copper, tinned plated copper, silver plated copper, and/or the like. Each conductor 24 may be formed from any number of strands of material. The insulative layers 28 are fabricated from any insulative, non-conductive materials, such as, but not limited to, polypropylene, FEP, polytetrafluoroethylene-perfluoromethylvinylether (MFA), PE, and/or the like. The jacket 16 may be fabricated from any at least partially dielectric materials, such as, but not limited to, a polymer, PVC, low smoke zero halogen PVC, FEP, polyvinylidene fluoride (PVDF), PE, nylon, and/or the like. Optionally, the jacket 16 is formed using an extrusion process. In some embodiments, the jacket 16 is formed from a yarn, a tape, and/or the like.

Figure 2:
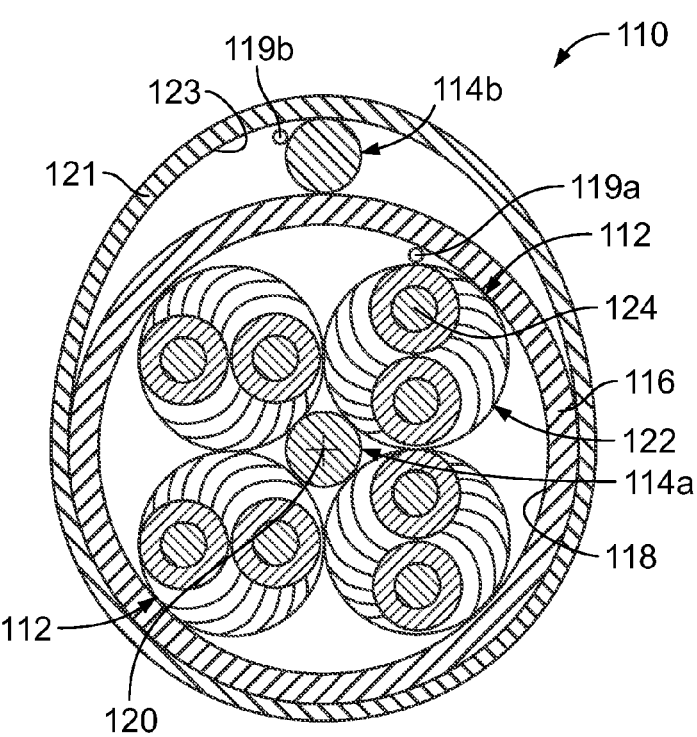
FIG. 2 is a cross-section of another exemplary embodiment of an electrical cable.

FIG. 2 is a cross section of another exemplary alternative embodiment of an electrical cable 110. The cable 110 includes a central core 112, two optical fibers 114a and 114b, an inner jacket 116, and an outer jacket 121. The cable 110 includes optional rip cords 119a and/or 119b for exposing various internal components of the cable 110, for example to enable termination of such components. The cable 110 extends a length along a central longitudinal axis 120. The inner jacket 116 extends around the central core 112 and one of the optical fibers 114a. The inner jacket 116 extends a length along the length of the cable 110 and includes an internal passageway 118 that extends along the length of the inner jacket 116. The central core 112 and the optical fiber 114a extend within the internal passageway 118 of the inner jacket 116 along the length of the inner jacket 116. The outer jacket 121 extends around the inner jacket 116. More specifically, the outer jacket 121 includes an internal passageway 123 within which the inner jacket 116, the central core 112, and the optical fiber 114a extend. Another of the optical fibers 114b extends between the inner and outer jackets 116 and 121, respectively. The inner jacket 116 may be referred to herein as an "inner cable jacket". The outer jacket 121 may be referred to herein as an "outer cable jacket".

The central core 112 includes a group of a plurality of twisted pairs 122 of insulated electrical conductors 124. Alternatively, the cable 110 includes a plurality of electrical conductors 124 that are not twisted into twisted pairs. Optionally, each of the twisted pairs 122 includes an electrical shield (not shown) that extends therearound. The electrical shield of each twisted pair 122 may be fabricated from any electrically conductive materials, structures, and/or the like, such as, but not limited to, an electrically conductive foil (e.g., a metal foil and/or the like), an electrically conductive tape (e.g., a metal tape and/or the like), and/or the like. In some embodiments, the conductors 124 of the twisted pairs 122 are configured to conduct data signals. The twisted pairs 122 extend within the internal passageway 118 of the inner jacket 116 such that the inner jacket 116 surrounds the twisted pairs 122. Optionally, the central core 112 includes a binder element (not shown) that extends around the group of twisted pairs 122 to hold the twisted pairs 122 together around the central longitudinal axis 120. The binder element is wrapped around the twisted pairs 122 to thereby hold the twisted pairs 122 together in the group, with the binder element forming the radially-outermost (relative to the central longitudinal axis 120) component of the central core 112. The binder element may be fabricated from any materials, structures, and/or the like, such as, but not limited to, a dielectric tape, an electrically conductive material (e.g, an electrically conductive foil, an electrically conductive tape, and/or the like such as, but not limited to, a metal foil, a metal tape, and/or the like), and/or the like. When fabricated from an electrically conductive material, the binder element may provide electrical shielding to the central core 112. The materials, structures, and/or the like of the binder element may be selected to comply with any applicable fire safety standards. Although four twisted pairs 122 are shown, the central core 112 may include any number of the twisted pairs 122.

In the exemplary embodiment of FIG. 2, the cable 110 includes two optical fibers 114a and 114b. However, the cable 110 may include any number of the optical fibers. The optical fibers 114a and 114b are independently held within the internal passageway 123 of the outer jacket 121 relative to each other. By "independently held", it is meant that optical fibers 114a and 114b are not held within a common insulative sub-jacket (not shown) of the cable 110. In other words, optical fibers that are independently held are not bundled together within a common jacket that extends within the internal passageway 123 of the outer jacket 121. In some embodiments, the cable 110 includes only a single optical fiber 114a or 114b. Each optical fiber 114a and 114b may be considered "sleeveless".

In the exemplary embodiment of FIG. 2, the optical fiber 114a extends within the internal passageway 118 of the inner jacket 116 along the length of the jacket 116. The optical fiber 114a extends between the twisted pairs 122 of the central core 112. The optical fiber 114a is positioned radially (relative to the central longitudinal axis 120) between the axis 120 and the twisted pairs 122 such that the twisted pairs 122 extend around the optical fiber 114a. The optical fiber 114a may extend along a helical path around the central longitudinal axis 120 or may extend along a path that is parallel to the central longitudinal axis 120 instead of a helical path. The optical fiber 114a may provide a central filler element between the twisted pairs, which may facilitate providing the cable 110 and/or the central core 112 with a predetermined shape (e.g., a circular cross-sectional shape). The diameter, number of, and arrangement of the optical fiber 114a may be selected to facilitate providing the cable 110 and/or the central core 112 with the predetermined shape. The optical fiber 114a includes an outer surface (which is defined by an outermost insulation layer if included) that may engage one or more of the twisted pairs 122.

The optical fiber 114b extends between the inner and outer jackets 116 and 121, respectively. More specifically, the optical fiber 114b is positioned radially (relative to the central longitudinal axis 120) between the inner and outer jackets 118 and 121, respectively. The outer jacket 121 surrounds the optical fiber 114b, which extends around the inner jacket 116. The optical fiber 114b may extend along a helical path around the inner jacket 116 (and around the central longitudinal axis 120) or may extend along a path that is parallel to the central longitudinal axis 120 instead of a helical path. The optical fiber 114b may provide a spacing element that facilitates spacing the twisted pairs 122 apart from neighboring electrical devices (e.g., the twisted pairs of a neighboring cable (not shown)). The diameter, number of, and arrangement of the optical fiber 114b may be selected to facilitate providing the cable 110 and/or the central core 112 with the predetermined shape. The optical fiber 114b includes an outer surface (which is defined by an outermost insulation layer if included) that may engage the inner jacket 116 and/or the outer jacket 121.

At least one of the optical fibers 114a and/or 114b is configured to sense a disturbance to the electrical cable 110. More specifically, at least one of the optical fibers 114a and/or 114b is configured to change the optical transmission characteristics thereof in response to a mechanical disturbance to the electrical cable 110. In some embodiments, at least one of the optical fibers 114a and/or 114b of the electrical cable 110 is used to transmit data signals.

Optionally, the optical fibers 114a and 114b are optically connected to each other. For example, ends (not shown) of the optical fibers 114a and 114b may be optically connected to each other at an end (not shown) of the electrical cable 110. In the exemplary embodiment of FIG. 2, the optical fibers include two discrete optical fibers 114a and 114b. In an alternative embodiment, 114a and 114b represent segments of the length of the same optical fiber that are connected together at a loop (not shown) of the optical fiber. In such an alternative embodiment wherein the electrical cable 110 includes an optical fiber having segments 114a and 114b that are connected together at a loop, the segments 114a and 114b are independently held within the internal passageway 123 of the outer jacket 121.

The inner and outer jackets 116 and 121, respectively, may each be fabricated from any at least partially dielectric materials, such as, but not limited to, a polymer, PVC, low smoke zero halogen PVC, FEP, polyvinylidene fluoride (PVDF), PE, nylon, and/or the like. In some embodiments, the inner jacket 116 and/or the outer jacket 121 is formed using an extrusion process. Moreover, in some embodiments, the inner jacket 116 and/or the outer jacket 121 is formed from a yarn, a tape, and/or the like. When formed from a yarn, tape, and/or the like, the inner jacket 116 and/or the outer jacket 121 may not be continuous along the length thereof, such that gaps extend within the jacket 116 and/or 121 (for example between adjacent winding turns, or wraps, of the tape, yarn, and/or the like). If formed from a yarn, tape, and/or the like, any gaps within the outer jacket 121 may expose portions of the optical fiber 114b. When the outer jacket 121 is formed from a yarn, tape, and/or the like, the optical fiber 114b may be considered to be "lashed" to the inner jacket 116 using the yarn, tape, and/or the like of the outer jacket 121.

Figure 3:
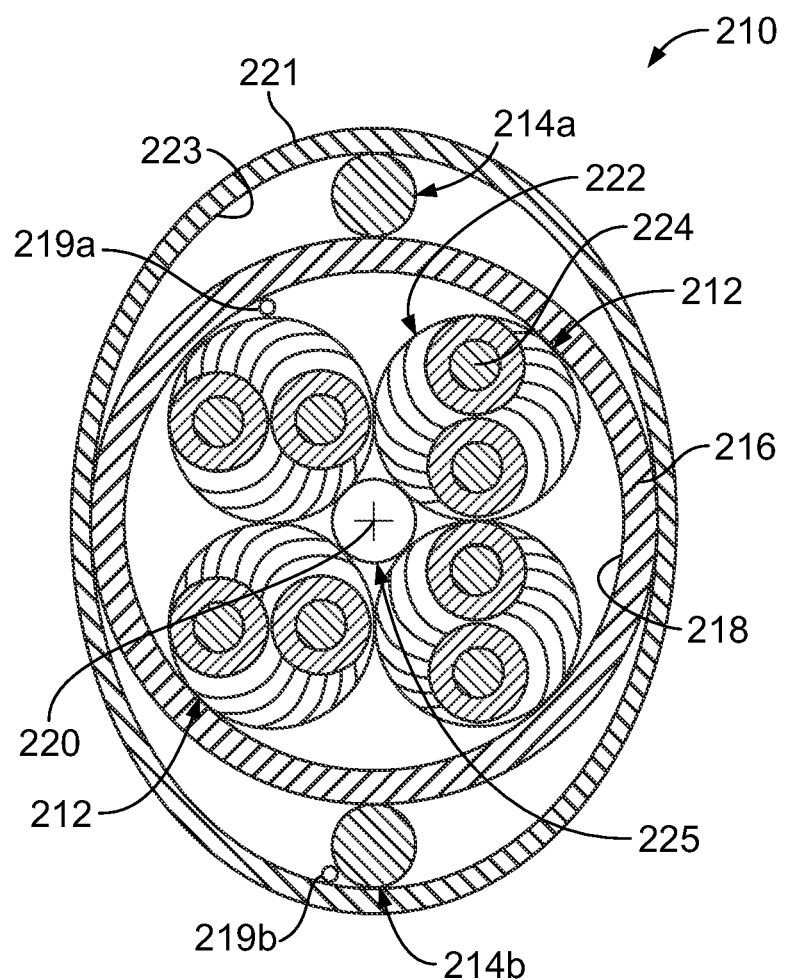
FIG. 3 is a cross-section of another exemplary embodiment of an electrical cable.

FIG. 3 is a cross section of another exemplary alternative embodiment of an electrical cable 210. The cable 210 includes a central core 212, two optical fibers 214a and 214b, an inner jacket 216, and an outer jacket 221. The cable 210 includes optional rip cords 219a and/or 219b for exposing various internal components of the cable 210, for example to enable termination of such components. The cable 210 extends a length along a central longitudinal axis 220. The inner jacket 216 extends around the central core 212. The inner jacket 216 includes an internal passageway 218 within which the central core 212 extends. The outer jacket 221 extends around the inner jacket 216. The outer jacket 221 includes an internal passageway 223 within which the optical fibers 214a and 214b, the inner jacket 216, and the central core 212 extend. The inner jacket 216 may be referred to herein as an "inner cable jacket". The outer jacket 221 may be referred to herein as an "outer cable jacket".

The central core 212 includes a group of a plurality of twisted pairs 222 of insulated electrical conductors 224. Alternatively, the cable 210 includes a plurality of electrical conductors 224 that are not twisted into twisted pairs. Optionally, each of the twisted pairs 222 includes an electrical shield (not shown) that extends therearound. The electrical shield of each twisted pair 222 may be fabricated from any electrically conductive materials, structures, and/or the like, such as, but not limited to, an electrically conductive foil (e.g., a metal foil and/or the like), an electrically conductive tape (e.g., a metal tape and/or the like), and/or the like. In some embodiments, the conductors 224 of the twisted pairs 222 are configured to conduct data signals. The twisted pairs 222 extend within the internal passageway 218 of the inner jacket 216 such that the inner jacket 216 surrounds the twisted pairs 222. Although four twisted pairs 222 are shown, the central core 212 may include any number of the twisted pairs 222.

Optionally, the central core 212 includes a binder element (not shown) that extends around the group of twisted pairs 222 to hold the twisted pairs 222 together around the central longitudinal axis 220. The binder element is wrapped around the twisted pairs 222 to thereby hold the twisted pairs 222 together in the group, with the binder element forming the radially-outermost (relative to the central longitudinal axis 220) component of the central core 212. The binder element may be fabricated from any materials, structures, and/or the like, such as, but not limited to, a dielectric tape, an electrically conductive material (e.g., an electrically conductive foil, an electrically conductive tape, and/or the like such as, but not limited to, a metal foil, a metal tape, and/or the like), and/or the like. When fabricated from an electrically conductive material, the binder element may provide electrical shielding to the central core 212. The materials, structures, and/or the like of the binder element may be selected to comply with any applicable fire safety standards. An optional central filler element 225 extends between the twisted pairs 222. Optionally, the central filler element 225 is fabricated from a flat tape, such as, but not limited to, an aluminum tape, an aluminum/polyester tape, and/or the like.

Although two are shown, the cable 210 may include any number of the optical fibers 214a and 214b. The cable 210 includes two optical fibers 214a and 214b that are independently held within the internal passageway 223 of the outer jacket 221 relative to each other. By "independently held", it is meant that optical fibers 214a and 214b are not held within a common insulative sub jacket (not shown) of the cable 210. In other words, optical fibers that are independently held are not bundled together within a common jacket that extends within the internal passageway 223 of the outer jacket 221. In some embodiments, the cable 210 includes only a single optical fiber 214a or 214b. Each optical fiber 214a and 214b may be considered "sleeveless".

The optical fibers 214a and 214b extend between the inner and outer jackets 216 and 221, respectively. More specifically, the optical fibers 214a and 214b are each positioned radially (relative to the central longitudinal axis 220) between the inner and outer jackets 216 and 221, respectively. The outer jacket 221 surrounds the optical fibers 214a and 214b, which extend around the inner jacket 216. The optical fibers 214a and 214b may each extend along a helical path around the inner jacket 216 (and around the central longitudinal axis 220) or may extend along a path that is parallel to the central longitudinal axis 220 instead of a helical path.

In the exemplary embodiment of FIG. 3, the optical fibers 214a and 214b are arranged approximately 180° from each other about the circumference of the inner jacket 216. However, the optical fibers 214a and 214b may be arranged between the inner jacket 216 and the outer jacket 221 in any other pattern than is shown in FIG. 3. For example, in some embodiments, the optical fiber 214a is arranged approximately 90° from the optical fiber 214b about the circumference of the inner jacket 216. The optical fibers 214a and 214b may provide spacing elements that facilitates spacing the twisted pairs 222 apart from neighboring electrical devices (e.g., the twisted pairs of a neighboring cable (not shown)). The diameter, number of, and arrangement of the optical fibers 214a and/or 214b may be selected to facilitate providing the cable 210 and/or the central core 212 with a predetermined shape (e.g., a circular cross-sectional shape). For example, in some embodiments, the cable 210 includes four optical fibers arranged approximately 90° relative to each other around the circumference of the inner jacket 216 to provide the cable 210 with a circular cross-sectional shape.

At least one of the optical fibers 214a and/or 214b is configured to sense a disturbance to the electrical cable 210. More specifically, at least one of the optical fibers 214a and/or 214b is configured to change the optical transmission characteristics thereof in response to a mechanical disturbance to the electrical cable 210. In some embodiments, at least one of the optical fibers 214a and/or 214b of the electrical cable 210 is used to transmit data signals.

Optionally, the optical fibers 214a and 214b are optically connected to each other. For example, ends (not shown) of the optical fibers 214a and 214b may be optically connected to each other at an end (not shown) of the electrical cable 210. In the exemplary embodiment of FIG. 3, the optical fibers include two discrete optical fibers 214a and 214b. In an alternative embodiment, 214a and 214b represent segments of the length of the same optical fiber that are connected together at a loop (not shown) of the optical fiber. In such an alternative embodiment wherein the electrical cable 210 includes an optical fiber having segments 214a and 214b that are connected together at a loop, the segments 214a and 214b are independently held within the internal passageway 223 of the outer jacket 221.

The inner and outer jackets 216 and 221, respectively, may each be fabricated from any at least partially dielectric materials, such as, but not limited to, a polymer, PVC, low smoke zero halogen PVC, FEP, polyvinylidene fluoride (PVDF), PE, nylon, and/or the like. In some embodiments, the inner jacket 216 and/or the outer jacket 221 is formed using an extrusion process. Moreover, in some embodiments, the inner jacket 216 and/or the outer jacket 221 is formed from a yarn, a tape, and/or the like. When formed from a yarn, tape, and/or the like, the inner jacket 216 and/or the outer jacket 221 may not be continuous along the length thereof, such that gaps extend within the jacket 216 and/or 221 (for example between adjacent winding turns, or wraps, of the tape, yarn, and/or the like). If formed from a yarn, tape, and/or the like, any gaps within the outer jacket 221 may expose portions of the optical fibers 214a and/or 214b. When the outer jacket 221 is formed from a yarn, tape, and/or the like, the optical fibers 214a and/or 214b may be considered to be "lashed" to the inner jacket 216 using the yarn, tape, and/or the like of the outer jacket 221.

The embodiments described and/or illustrated herein may provide a secure electrical cable. For example, the embodiments described and/or illustrated herein may provide an electrical cable having electrical conductors for conducting data signal and having an optical fiber for monitoring a security of the cable by sensing a disturbance to the electrical cable. The embodiments described and/or illustrated herein may provide an electrical cable having twisted pairs for conducting data signals and an optical fiber for monitoring a security of the cable by sensing a disturbance to the electrical cable, for example. Moreover, and for example, by using one or more optical fibers that are independently held within a jacket of the cable, instead of being grouped under a common sub-jacket, the embodiments descried and/or illustrated herein may provide an electrical cable having both electrical conductors and optical fibers that is smaller than at least some known electrical cables.

In the above description, the cables 10, 110, and 210 are described and/or illustrated in terms of premise cabling, such as, but not limited to, a data communication cable and/or the like. However, it is to be understood that the subject matter described and/or illustrated herein are also applicable to other types of cables, including, but not limited to, wires, cords, cables, and/or the like of any type. The foregoing description and illustrations are therefore provided for illustrative purposes only and are but one potential application of the subject matter described and/or illustrated herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described and/or illustrated herein without departing from its scope. Dimensions, types of materials, orientations of the various components, and the number and positions of the various components described and/or illustrated herein are intended to define parameters of certain embodiments, and are by no means limiting and are merely exemplary embodiments. Many other embodiments and modifications within the spirit and scope of the claims will be apparent to those of skill in the art upon reviewing the above description and the drawings. The scope of the subject matter described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An electrical cable comprising:
   a cable jacket extending a length and having an internal passageway that extends along the length of the cable jacket;
   twisted pairs of insulated electrical conductors extending within the internal passageway along the length of the cable jacket, each twisted pair comprising two insulated electrical conductors twisted together in a helical manner; and
   at least two optical fibers extending within the internal passageway along the length of the cable jacket, wherein the optical fibers are independently held within the internal passageway of the cable jacket relative to each other, wherein an outer surface of at least one of the optical fibers is engaged with at least one of the twisted pairs.

2. The electrical cable of claim 1, wherein the optical fibers are not held within a common sub-jacket that extends within the internal passageway of the cable jacket.

3. The electrical cable of claim 1, wherein the cable jacket is an outer cable jacket, the cable further comprising an inner cable jacket extending within the internal passageway of the outer jacket, the inner cable jacket surrounding the twisted pairs and a first of the optical fibers, a second of the optical fibers extending between the inner and outer jackets.

4. The electrical cable of claim 1, wherein at least one of the optical fibers is located in the internal passageway between the twisted pairs.

5. The electrical cable of claim 1, wherein the twisted pairs are configured to conduct data signals.

6. The electrical cable of claim 1, wherein the optical fibers are optically connected together.

7. The electrical cable of claim 1, wherein at least one of the optical fibers comprises an insulative coating.

8. An electrical cable comprising:
   an outer cable jacket extending a length and having an internal passageway that extends along the length of the outer cable jacket;
   twisted pairs of insulated electrical conductors extending within the internal passageway along the length of the outer cable jacket, each twisted pair comprising two insulated electrical conductors twisted together in a helical manner;

at least first and second optical fibers extending within the internal passageway along the length of the outer cable jacket, at least one of the first optical fiber or the second optical fiber being configured to sense a disturbance to the electrical cable; and an inner cable jacket extending within the internal passageway of the outer cable jacket, the inner cable jacket surrounding the twisted pairs and the first optical fiber, the second optical fiber extending between the inner and outer cable jackets.

9. The electrical cable of claim 8, wherein the first optical fiber is located within the internal passageway between the twisted pairs.

10. The electrical cable of claim 8, wherein the twisted pairs are configured to conduct data signals.

11. The electrical cable of claim 8, wherein at least one of the first optical fiber or the second optical fiber comprises an insulative coating.

12. The electrical cable of claim 8, wherein the at least one of the first optical fiber or the second optical fiber is configured to sense the disturbance to the electrical cable by communicating an optical signal change along the at least one of the first optical fiber or the second optical fiber.

13. The electrical cable of claim 8, wherein an outer surface of the first optical fiber is engaged with at least one of the twisted pairs.

14. An electrical cable comprising:

an outer cable jacket extending a length and having an internal passageway that extends along the length of the outer cable jacket;

electrical conductors extending within the internal passageway along the length of the outer cable jacket, the electrical conductors being configured to conduct data signals;

at least two optical fibers extending within the internal passageway along the length of the outer cable jacket, wherein the at least two optical fibers are independently held within the internal passageway of the outer cable jacket relative to each other; and an inner cable jacket extending within the internal passageway of the outer cable jacket, the inner cable jacket surrounding the electrical conductors, at least one of the at least two optical fibers extending between the inner and outer cable jackets.

15. The electrical cable of claim 14, wherein the optical fibers are not held within a common sub-jacket that extends within the internal passageway of the outer cable jacket.

16. The electrical cable of claim 14, wherein the at least two optical fibers comprise first and second optical fibers, the first and second optical fibers extending between the inner and outer cable jackets.

* * * * *